United States Patent Office 3,247,214
Patented Apr. 19, 1966

3,247,214
2-AMINO-6-THIO HYDROCARBON-PYRIDINES
Francis Johnson, Newton Lower Falls, Mass., assignor to The Dow Chemical Company, Midland, Mich., a corporation of Delaware
No Drawing. Filed Mar. 19, 1963, Ser. No. 266,196
15 Claims. (Cl. 260—294.8)

The present invention is directed to processes for preparing novel substituted pyridines.

It is an object of the present invention to provide novel 2-amino-6-thiohydrocarbonpyridines. It is also an object of this invention to provide processes for preparing said novel compound.

I discovered that the acid salts of 2-amino-6-thiohydrocarbonpyridines are prepared when a 3-hydroxyglutaronitrile I or a glutaronitrile II, is reacted with a mercaptan in the presence of a strong mineral acid as illustrated below:

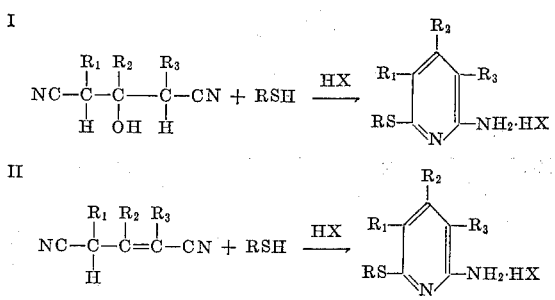

The isolation of these salts is accomplished by removal of the reaction solvent. The free base is prepared by neutralization of the salt.

The 3-hydroxyglutaronitriles and the equivalent glutacononitriles useful in my process may be substituted by any group ($R_1$, $R_2$ and/or $R_3$) which is stable under the reaction conditions. These include hydrogen; lower alkyls, such as methyl, ethyl, octyl, benzyl, ethylphenyl; monocyclic aryls, such as phenyl and nitrophenyl; etc.

The mercaptan reactant may contain any group which is stable in the presence of a strong mineral acid. R groups may be a lower alkyl, such as methyl, ethyl, butyl, octyl, phenylethyl, phenylmethyl, etc., a monocyclic alkyl such as cyclopentyl and cyclohexyl, or a monocyclic aryl such as phenyl, chlorophenyl, dimethylphenyl, nitrophenyl, etc.

The basic reaction between the dicyano compound and the mercaptan involves a cyclization which takes place in the presence of strong mineral acids, and particularly those acids which readily form salts with amines, such as the hydrohalides, sulfuric acid, and phosphoric acid. The hydrohalides and particularly hydrogen chloride and hydrogen bromide are preferred.

A reaction solvent inert to the reactants may be utilized. These include such solvents as acetic acid, anhydrous ethyl and/or butyl ethers, ethylene dichloride, chloroform, carbon tetrachloride, nitromethane, benzene, methylene chloride, etc. The preferred solvents are acetic acid, chloroform and propionic acid.

The cyclization reaction occurs over a wide range of temperatures, as much as from about $-50°$ C. to about $200°$ C. The upper limit is the decomposition temperature of the reactants and/or solvents and/or other components of the reaction mixture. The reaction goes to completion more rapidly at higher temperatures. As much as twelve hours may be required at room temperature for the reaction to go. The preferred reaction temperature is between $100°$ C. and $200°$ C.

The reactants may be present in the reaction mixture in the stoichiometric proportion, i.e., a 1:1 molar ratio. It is preferred that the mercaptan be present in excess. Twice the stoichiometric amount is preferred to obtain best yields. The amount of the preferred hydrogen halide or other acid may vary. For best results, one equivalent of the acid is preferred, especially in the reactions conducted at room temperatures. Smaller amounts give good yields at higher temperatures. The yields obtained experimentally vary between 40% to as much as 100%.

The pyridines are obtained from the reaction mixtures by conventional separating techniques. A preferred method involves neutralizing the acid solution, separating the organic layer, and crystallizing the pyridine from a preferred solvent such as methylene chloride.

For the purpose of further explaining the invention to those skilled in the art, the following illustrative example is given:

2-AMINO-6-THIOPHENYLPYRIDINE

Benzenethiol (0.15 mole) and 3-hydroxyglutaronitrile (0.05 mole) were treated with hydrogen bromide (0.045 mole) in acetic acid (12 ml.) and the mixture heated at $120°$ C. for two hours. An excess of sodium hydroxide solution (8 N; 100 ml.) and methylene chloride was added. Two layers formed and the organic layer was separated, washed with water, dried ($MgSO_4$) and evaporated to dryness. The residual oil crystallized easily from methylene chloride-ether. The yield was 59% of material having a melting point between 117 and $117.5°$ C.

Found: C, 65.1; H, 5.2; N, 13.6; S, 16.1.
Req'd for $C_{11}H_{10}N_2S$: C, 65.1; H, 5.3; N, 13.8; S, 15.8%.

Following the same procedure, glutaconitrile was used in place of the 3-hydroxyglutaronitrile to obtain essentially the same yield of the same product. Similar results were also obtained using 4-chlorophenyl mercaptan in place of benzenethiol, in the preparation of 1-amino-6-(4-chlorophenylthio)pyridine.

Similar products are obtained using hydrogen chloride and hydrogen iodide as the catalyst and propionic acid or chloroform as the solvent in place of acetic acid. The mercaptans listed in Table I may each be reacted with one of the compounds of Table II, to prepare 2-amino-6 thiohydrocarbon pyridines.

Table I

Octyl mercaptan
Ethyl mercaptan
2-ethylhexyl mercaptan
Chlorohexyl mercaptan
Methyl mercaptan
Tolyl mercaptan
p-Methoxyphenyl mercaptan
p-Phenoxyphenyl mercaptan
4-chlorophenyl mercaptan
4-tolyl mercaptan
Phenyl mercaptan
Cyclohexyl mercaptan
Benzyl mercaptan
Mercaptoacetic acid

Table II 1,3-dicyanopropanol-2
1,3-dicyano-2-methylpropanol-2
1,3-dicyanopropene
1,3-dicyano-2-phenylpropanol-2
1,3-dicyano-2-ethylpropanol-2
1,3-dicyano-1-butylpropanol-2
1,3-dicyano-2,3-diethylpropene-1
1,3-dicyano-1-methoxypropene-1
1,3-dicyano-2-cyclohexylpropene-1
1,3-dicyano-1-p-chlorophenylpropene-1

The 2-amino-6-thiohydrocarbonpyridines and the hydrohalide salts are useful as selective herbicides and insecticides.

As many embodiments of this invention may be made without departing from the spirit and scope thereof, it is to be understood that the invention includes all such modifications and variations as come within the scope of the appended claims.

Reference is made to my patent application Serial No. 266,194, directed to the novel 1-thiohydrocarbon-3-aminoisoquinolines, filed March 19, 1963, which is made a part hereof.

What is claimed is:

1. A process for preparing 2-amino-6-thiohydrocarbonpyridines comprising reacting a
    (i) mercaptan having the formula RSH, wherein R is selected from the group consisting of lower alkyl, cyclopentyl, cyclohexyl, and monocyclicaryls; and
    (ii) a dinitrile selected from the group consisting of 3-hydroxylglutaronitriles and gultaronitriles;
in the presence of a strong acid and at a temperature between −50° C. and 200° C.; and neutralizing to obtain the free base.

2. The process of claim 1 wherein the mercaptan is present in excess of a 1:1 molar ratio with the dinitrile; the strong acid is a hydrohalide; and the temperature is between 100° C. and 200° C.

3. The process of claim 2 wherein the hydrohalide is hydrogen bromide.

4. The process of claim 2 wherein the hydrohalide is hydrogen chloride.

5. The process of claim 2 wherein the hydrohalide is hydrogen iodide.

6. The process of claim 2 wherein the ratio of the mercaptan to the dinitrile is about 2:1.

7. The process of claim 2 wherein the dinitrile is 3-hydroxyglutaronitrile.

8. The process of claim 2 wherein the dinitrile is glutacononitrile.

9. The process of claim 2 wherein the mercaptan is benzenethiol.

10. The process of claim 7 wherein the mercaptan is benzenethiol.

11. The process of claim 8 wherein the mercaptan is benzenethiol.

12. A process for preparing acid salt of 2-amino-2-thiohydrocarbonpyridines comprising reacting a
    (i) mercaptan having the formula RSH, wherein R is selected from the group consisting of lower alkyl, cyclopentyl, cyclohexyl, and monocyclicaryls; and
    (ii) a dinitrile selected from the group consisting of 3-hydroxylglutaronitriles and glutaronitriles;
in the presence of a strong acid and at a temperature between −50° C. and 200° C.

13. 2-amino-6-thiohydrocarbonpyridines having the formula:

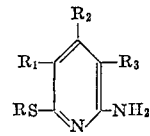

wherein:

$R_1$, $R_2$ and $R_3$ are each selected from the group consisting of hydrogen lower alkyl, phenyl, and chlorophenyl; and R is selected from the group consisting of lower alkyl, benzyl, cyclopentyl, cyclohexyl, phenyl, chlorophenyl, dimethylphenyl, methylphenyl, nitrophenyl, methoxyphenyl, and phenoxyphenyl.

14. 2-amino-6-thiophenylpyridine.

15. The acid salts of 2-amino-6-thiohydrocarboxypyridines having the formula

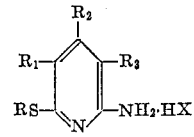

wherein:

$R_1$, $R_2$ and $R_3$ are each selected from the group consisting of hydrogen, lower alkyl, phenyl, and chlorophenyl; and R is selected from the group consisting of lower alkyl, benzyl, cyclopentyl, cyclohexyl, phenyl, chlorophenyl, dimethylphenyl, methylphenyl, nitrophenyl, methoxyphenyl, and phenoxyphenyl; and X is selected from the group consisting of the halides, sulfate and phosphate.

References Cited by the Examiner

"Chemical Abstracts," 1956 Decennial Index, pp. 10528s–10531s.

Klingsberg: "Heterocyclic Compounds, Pyridine and Its Derivatives," Part 3, pp. 63, 513. (Interscience 1962.)

WALTER A. MODANCE, *Primary Examiner.*

NICHOLAS S. RIZZO, *Examiner.*